(12) United States Patent
Rodriguez Puente

(10) Patent No.: US 11,994,265 B2
(45) Date of Patent: May 28, 2024

(54) LIGHTING ASSEMBLY FOR A VEHICLE AND METHOD FOR PRODUCING A LIGHTING ASSEMBLY

(71) Applicant: Volkswagen Aktiengesellschaft, Wolfsburg (DE)

(72) Inventor: Jose De Jesus Rodriguez Puente, Puebla (MX)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/942,331

(22) Filed: Sep. 12, 2022

(65) Prior Publication Data
US 2023/0084363 A1 Mar. 16, 2023

(30) Foreign Application Priority Data
Sep. 10, 2021 (EP) .................................. 21195982

(51) Int. Cl.
| | |
|---|---|
| *F21S 41/37* | (2018.01) |
| *F21S 41/20* | (2018.01) |
| *F21S 41/40* | (2018.01) |
| *F21V 3/04* | (2018.01) |

(52) U.S. Cl.
CPC ............. *F21S 41/37* (2018.01); *F21S 41/285* (2018.01); *F21S 41/40* (2018.01); *F21V 3/049* (2013.01)

(58) Field of Classification Search
CPC .................................. F21S 41/28; F21S 41/37
See application file for complete search history.

(56) References Cited

U.S. PATENT DOCUMENTS

| | | | | |
|---|---|---|---|---|
| 5,001,610 | A * | 3/1991 | Otaka ..................... | F21S 43/26 362/543 |
| 6,352,359 | B1 * | 3/2002 | Shie ........................ | F21S 43/26 362/334 |
| 7,182,494 | B2 * | 2/2007 | Nakayama ........... | B60Q 1/2696 362/521 |
| 8,273,444 | B2 * | 9/2012 | Suzuki ..................... | B44F 5/00 362/546 |
| 10,046,693 | B2 * | 8/2018 | Terai .................... | B60Q 1/0041 |
| 11,014,489 | B2 | 5/2021 | Muegge | |
| 11,052,816 | B2 * | 7/2021 | Muegge .................. | F21S 43/14 |

(Continued)

FOREIGN PATENT DOCUMENTS

| | | |
|---|---|---|
| DE | 3828522 A1 | 3/1990 |
| DE | 102012012330 A1 | 12/2013 |

(Continued)

*Primary Examiner* — Matthew J. Peerce
(74) *Attorney, Agent, or Firm* — Laurence A. Greenberg; Werner H. Stemer; Ralph E. Locher

(57) ABSTRACT

A lighting assembly for a vehicle has a light source accommodated in a housing. The light source is configured to emit light. The lighting assembly has an outer lens coupled to the housing. At least a portion of the outer lens is positioned to receive light emitted from the light source and to transmit the received light to the outside. A black mask member surrounds the portion of the outer lens. The portion of the outer lens that is disposed to receive the light has an inner surface at least a part of which is formed with an integrally formed surface texture. The surface texture is configured to diffusively transmit the light received from the light source.

12 Claims, 3 Drawing Sheets

(56) References Cited

U.S. PATENT DOCUMENTS

| | | | | |
|---|---|---|---|---|
| 2006/0176710 A1* | 8/2006 | Meinke | ............... | B60R 13/005 |
| | | | | 362/503 |
| 2014/0160777 A1 | 6/2014 | Muegge | | |
| 2019/0170317 A1* | 6/2019 | Gloss | .................. | F21S 43/245 |
| 2021/0190284 A1* | 6/2021 | Paroni | ................. | F21S 41/295 |

FOREIGN PATENT DOCUMENTS

| | | |
|---|---|---|
| DE | 102017117392 A1 | 2/2019 |
| DE | 102018130056 A1 | 6/2019 |
| EP | 1411291 A2 | 4/2004 |
| EP | 3208527 A1 | 8/2017 |
| EP | 3483499 A1 | 5/2019 |
| FR | 3007821 A1 | 1/2015 |
| JP | 6609135 B2 | 11/2019 |

\* cited by examiner

LIGHTING ASSEMBLY FOR A VEHICLE AND METHOD FOR PRODUCING A LIGHTING ASSEMBLY

CROSS-REFERENCE TO RELATED APPLICATION

This application claims the priority, under 35 U.S.C. § 119, of European Patent Application EP21195982.0, filed Sep. 10, 2021; the prior application is herewith incorporated by reference in its entirety.

FIELD AND BACKGROUND OF THE INVENTION

The invention relates to a lighting assembly for a vehicle, in particular a rear-light assembly, or tail light, or a headlight assembly. A further aspect of the invention relates to a vehicle comprising the lighting assembly. Another aspect of the invention relates to a method of manufacturing a lighting assembly.

A typical lighting assembly for vehicles comprises a light source accommodated in a housing which is covered by an outer lens or cover to protect the light source and to transmit the emitted light from the light source to the outside of the vehicle. The transmitted light provides illumination and indicates information, warnings, driving maneuvers to observers, other drivers or traffic participants.

German published patent application DE 10 2012 012 330 A1 discloses a lighting assembly for a vehicle which comprises a cover and a housing with an internal primary light source. A secondary light source is provided which illuminates the coupling edge where the cover is coupled to the housing.

Various new lighting designs for exterior lighting assemblies of vehicles have been developed recently. Often, however, there is a problem in that the lighting function of many newly developed lighting assemblies is not sufficiently clear and precise. Additionally, in many cases, the light that is output is not sufficiently homogeneous over the entire light emission surface of the lighting assembly.

On the other hand, also the thickness of the outer lens as well as material costs should be reduced as much as possible and additional layers for the purpose of homogenization would not fulfil these requirements.

In an additional related aspect, particular classes of lighting assemblies refer to providing light signatures or light functions which extend over a slit or a gap, for example from a left corner to the center of the front or the rear of a vehicle. The emitted light of such lighting assemblies is intended to form a common lighting signature.

However, due to the gap or slit an interruption of this extended light signature is generated. This interruption however leads to a visual distance of the light signature which is optically recognized by an observer, i.e., by another driver or another traffic participant. Such visual distance may lead to an optical irritation due to the disconnection of the light signal. Also, the visual distance leads to a reduced design and reduced aesthetic appearance.

SUMMARY OF THE INVENTION

It is accordingly an object of the invention to provide an automotive lighting assembly which overcomes the above-mentioned disadvantages of the heretofore-known devices and methods of this general type and which provides for a lighting assembly with a distinct and homogenized lighting function that has reduced thickness and can be manufactured with lower material costs. A further related aspect is to improve the continuity of lighting signatures across the slit, in particular when viewed under small angles, with reduced thickness and material costs.

With the above and other objects in view there is provided, in accordance with the invention, a lighting assembly for a vehicle, the lighting assembly comprising:
 a housing;
 a light source disposed in said housing and configured to emit light;
 an outer lens coupled to said housing, said outer lens having a transmission portion thereof positioned to receive light emitted from said light source and to transmit the light to an outside of said housing;
 a black mask member at least partially surrounding said transmission portion of said outer lens; and said transmission portion of said outer lens having an inner surface formed, at least in a part of said inner surface, with an integrally formed surface texture configured to diffusively transmit the light received from said light source.

In other words, one aspect of the invention pertains to a lighting assembly for a vehicle. The lighting assembly comprises a light source accommodated in a housing and configured to emit light. The lighting assembly further comprises an outer lens coupled to the housing, wherein at least a portion of the outer lens is positioned to receive light emitted from the light source and to transmit the received light to the outside. Further, a black mask member at least partially surrounds the portion of the outer lens. The portion of the outer lens comprises an inner surface, wherein at least a part of the inner surface comprises an integrally formed surface texture to diffusively transmit light received from the light source.

An outer lens may be in other words an outer cover, an outside cover or an exterior lens. The outer lens may cover the light source to the outside. A lighting assembly may be a lighting device. The outer lens may be coupled to the respective housing to form an enclosure for the light source. The light source may be any source that is capable of irradiating, reflecting or transmitting light. For example, the light source may be an array of LEDs or any other direct or indirect light emitter as for example a light reflector, a light collimator, a light pipe, a lamp or a light surface or the like. The outer lens may be made of plastic, for example PMMA (poly(methyl methacrylate)), but the invention is not restricted thereto. The outer lens may have an at least partially transparent component corresponding to the emitted light. For example, the outer lens may be clear, or in other words "white," or for example of red color, but the invention is not restricted thereto. A black mask member may be a member which absorbs light generated by the light source. The black mask member may have the function to prevent any light to pass or exit to the outside via the black mask member. That is, the black mask member may help to provide a clear and distinct light signature that is only outputted via the dedicated emissive portion of the outer lens. A surface texture may be a microscopic structuring. The texture is integral and with the outer lens forming the inner surface. The texture may be in other words a graining or a grained surface.

The present invention has the technical advantage that the texture of the inner surface leads to diffused transmission of the incident light at the texture. That is, at least a fraction of parallel light is split into a diffusively transmitted light having different propagation directions. The transmitted light is thus homogenized and softer. This effect does not occur for a flat or an even inner surface. Additionally, such a device does not involve an additional member, i.e., a diffusor or an additional coating layer, such that thickness remains low and no additional coupling is required.

Preferably, the surface texture may have a surface roughness with an arithmetic mean deviation, Ra, between 0.4 and 18 µm, preferably between 4 and 18 µm. These values may comply with the standard VDI 3400, in particular to the VDI reference values 12 to 45. When the roughness is in this range, incident light can be diffusively transmitted. A maximum height variation of the texture may preferably range from 1.5 to 48 µm. It will be understood that the invention is not restricted to these parameters.

Preferably, the entire inner surface may comprise the surface texture. Thus, a complete graining may be obtained. Then, the entire inner surface serves to homogenize the incident light received from the light source.

The inner surface of the outer lens may comprise a plurality of protrusions formed in the inner surface, wherein each protrusion comprises the surface texture. Each of the individual protrusions contribute to the effect of homogenization and form local light diffusion centers. Localized protrusions with surface roughness can be readily manufactured by using injection molding with an etched tool. Thus, the emitted light becomes homogenized over the emission area due to the distribution of the protrusions having the roughness.

The protrusions may have a square, a rectangular and/or a circular cross section. These geometries can be readily manufactured, i.e., by injection molding using an etched tool.

The plurality of protrusions may be arranged to form a regular array of protrusions spaced apart from each other. Such structural patterning of the protrusions can be manufactured systematically and in a controlled manner. In other words, the processes may form or may be arranged in a regular grid. Due to the regular array, the light emission becomes more homogenized since the light diffusion centers are equally distributed over the inner surface, i.e. the areal density of protrusions is then constant.

The lighting assembly may comprise a first outer lens corresponding to a first light source and a second outer lens corresponding to a second light source, each outer lens being transparent for the emitted light of the respective light source in an outwards direction. The outer lenses may be spatially separated from each other by a separation slit; and each outer lens may further comprise an inwardly extending lens portion which extends in an inwards direction on a respective side of the slit, wherein inner surfaces of the inwardly extending lens portion comprise the surface texture. The surface texture being present reduces the light clearance, i.e. the visual lighting distance, over the slit, in particular the slit becomes optically continuous across the slit under small observation angles. The material costs at the sides of the slit and the thickness is reduced due to the use of the integral surface texture of the inner surface.

In an additional aspect of the present invention, a method of manufacturing a lighting assembly according to one of the above embodiments is disclosed. The method comprises the step of processing at least a portion of an inner surface of at least a portion of an outer lens to obtain an integrally formed surface texture to diffuse received light. The method further comprises to accommodate a light source in a housing to emit light. The method further comprises to couple the outer lens to the housing, wherein the portion of the outer lens is positioned to receive light emitted from the light source and to transmit the received light to the outside. The method further comprises to dispose a black mask member to surround the portion of the inner surface. The advantages mentioned above in the context of the lighting assembly and the embodiments described above also apply for the method.

The processing of the outer lens may comprise injection molding using an etched tool to generate the surface texture. With etching of the tool local and microscopic surface roughness can be readily generated in a size range suitable for diffusive transmission. The negative of the texturing may be etched into the tool device. The tool may be a steel tool. The outer lens may be plastic, i.e., PMMA. For example, the surface roughness may be quantified by an arithmetic mean deviation, Ra, between 0.4 and 18 µm, preferably between 10 and 18 µm.

Preferably, the etching may comprise laser etching or chemical etching. Laser etching is a process in which a laser is used to remove material. The laser etching involves that the laser is directed on the material which is locally melted where the laser light is incident to the inner surface. Chemical etching is a process using chemical etchants to remove material where the etchant contacts the surface. The local roughness can be easily generated by using said etching processes, in particular for a plastic and for reaching the desired surface roughness as indicated above.

In another aspect of the present invention, the vehicle comprises a lighting assembly. The lighting assembly may be installed in the vehicle, e.g. as rear-lighting assembly (tail light) or head-lighting assembly (head light).

It will be understood that the various embodiments and features of the present invention as disclosed are advantageously combinable with each other unless not explicitly mentioned otherwise.

Other features which are considered as characteristic for the invention are set forth in the appended claims.

Although the invention is illustrated and described herein as embodied in a lighting assembly for a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
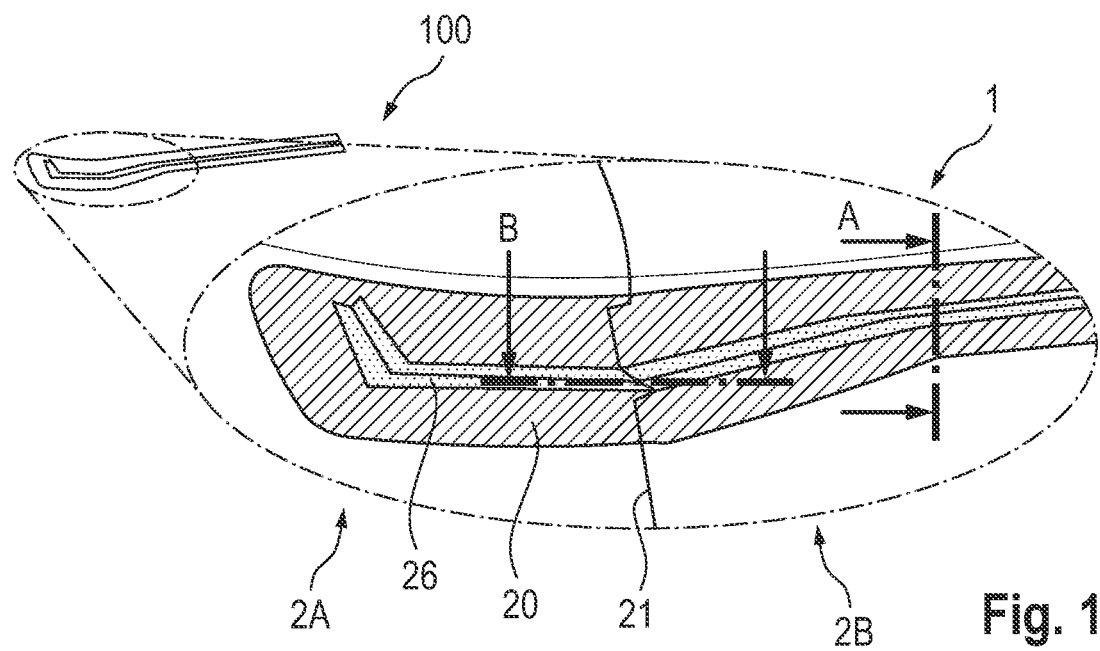
FIG. 1 is a partial view of a vehicle with a lighting assembly according to an embodiment of the invention.

Referring now to the figures of the drawing in detail and first, in particular, to FIG. 1 thereof, there is shown a vehicle 100 from a rear view perspective with a lighting assembly 1 according to an inventive concept of the invention. The lighting assembly 1 in this particular example refers to a rear-lighting assembly as illustrated in FIG. 1. In other embodiments the assembly may be a front-lighting assembly. The various inventive concepts of the lighting assembly 1 will be explained in more detail in the context of the FIGS. 2 to 7 and the description thereto.

As can be seen in particular in the enlarged insert of FIG. 1, the lighting assembly 1 comprises an outer lens 20. The lighting assembly 1 further comprises a light source, which is positioned, in this perspective, behind the outer lens 20 (not shown in this perspective). The outer lens 20, also referred as an outer cover or outside cover, is configured to emit light to the outside or in other words in an outward direction. The outer lens 20 may be at least partially transparent for the emitted light of the respective light source. For example, the outer lens 20 may be clear or colored, e.g. colored in red, but the invention is not restricted thereto.

The lighting assembly 1 comprises a surface texture 26 on at least a part of an inner surface 24 (facing to the inside in this perspective view) of the outer lens 20, which will be explained in more detail in the context of the FIGS. 2-6. The surface texture 26 of the inner surface 24 is configured to homogenize the respective emitted light from the light source.

As can be further seen in FIG. 1, a slit 21 may be formed in the outer lens 20. The slit 21 may divide the lighting assembly 1 into a first lighting array 2A and a second lighting array 2B separated by said slit 21. However, the invention is not restricted thereto, and in other embodiments a lighting array may only be present on either side of the slit 21. In this example, the first lighting array 2A may be rigidly connected to the vehicle 100. The second lighting array 2B may be part of a trunk lid that is movably, i.e. rotatably, coupled to the vehicle 100. The lighting assembly 1 may also be a headlight assembly, which is here not shown explicitly.

Figure 2:
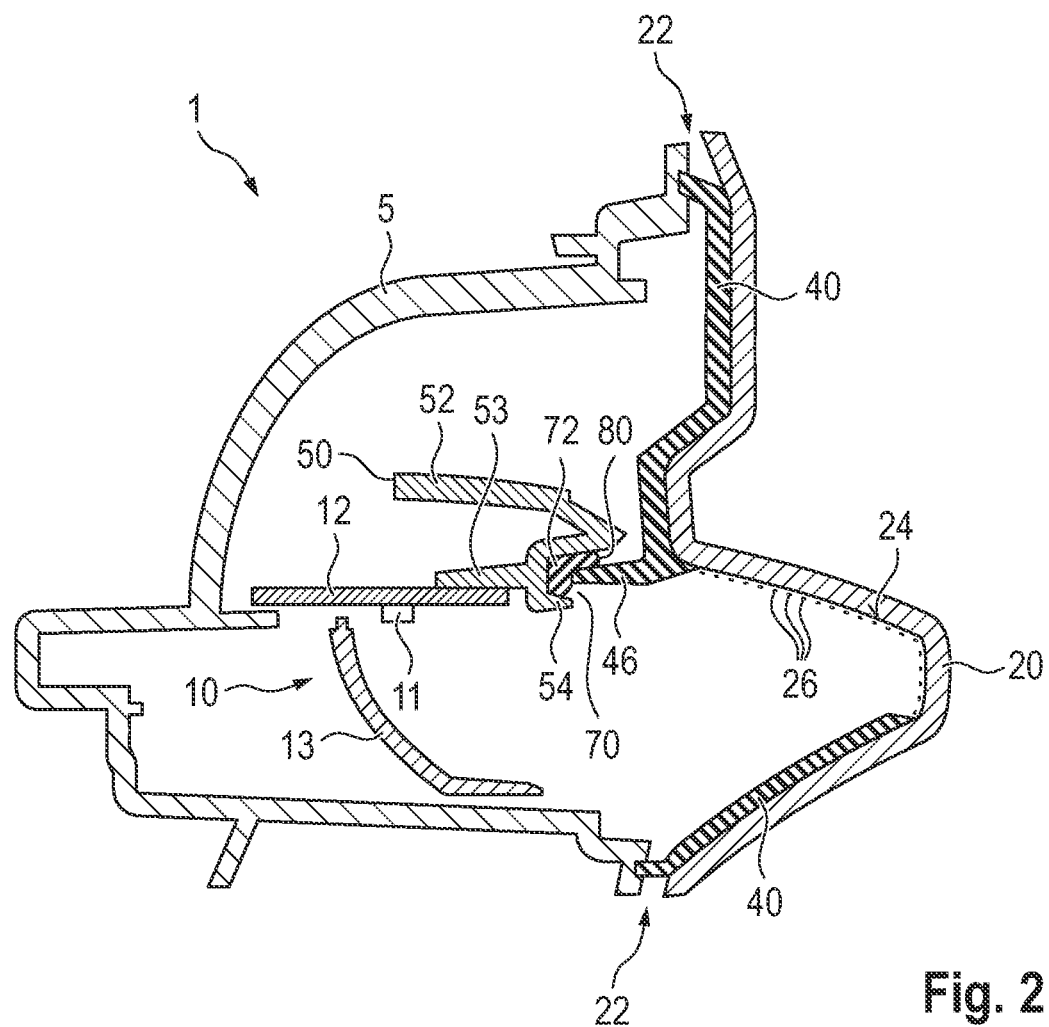
FIG. 2 is a sectional view of a lighting assembly according to an embodiment of the invention.

FIG. 2 shows a section through the lighting assembly 1 taken along the line A shown in FIG. 1. The section is for mere illustration, i.e., the section A may also be at a position where the section line B is indicated in FIG. 1.

The lighting assembly 1 comprises a housing member 5, or housing 5, for accommodating internal elements. The housing 5 may be formed of a metal, e.g. aluminium or steel, or of plastic, or a combination thereof.

The lighting assembly 1 may further comprise a light source 10. The light source 10 is accommodated in the housing 5. The light source 10 is configured to emit light. The light source 10 in this example may comprise one or more LEDs 11 as direct light source and a light reflector 13 as indirect light source, which reflects the light of the LEDs 11 in reflection directions. The LEDs may be arranged in an LED array. The LEDs 11 may be positioned on a printed circuit board 12 which may include wirings to connect and control the LEDs. However, the invention is not restricted to a particular type of light source 10. For example, the light source may be another direct or indirect light emitter as for example a light collimator, a light pipe, a lamp, or a light surface.

The light assembly 1 comprises an outer lens 20 or in other words an outer cover. The outer lens 20 may protect the light assembly 1 to the outside direction to prevent the internal elements from e.g. impacts or humidity. Further, the outer lens 20 is at least partially transparent for the emitted light of the light source 10. At least a portion of the outer lens 20 is positioned to receive light emitted from the light source 10 and to transmit the received light to the outside. For example, light emitted by the LEDs 11 may be directly or indirectly transmitted via the light reflector 13 through the outer lens 20 to the outside.

The outer lens 20 may be coupled to the respective housing 5 to form a common enclosure for the light source 10. Preferably, the outer lens 20 may be coupled to the housing 5 by a welding connection 22. In the present case, the outer lens 20 is indirectly coupled to the housing 5 by being connected to a black mask member 40, wherein the black mask member 40 is connected through the connection 22. Further, the outer lens 20 may be formed in various profile geometries to generate a desired optical appearance of the light function.

The lighting assembly 1 further comprises a black mask member 40. The black mask member 40 may be a light absorber for absorbing the light emitted by the light source 10. The black mask member 40 surrounds the portion of the outer lens 20 through which light is emitted to the outside. The black mask member 40 thus has the effect of providing a sharp and clear definition of the light function. The black mask member 40, in the section view, may comprise an upper part and a lower part. Both upper and lower parts may be, as shown in the FIG. 2, in direct contact with an inner surface 24 of the outer lens 20, e.g. skin molding injected. In other embodiments, the black mask member 40 may also form an extension of the outer lens 20, e.g. by direct injection as outer lens. Both upper and lower part directly contact with the outer lens 20 to surround the portion of the outer lens 20 from which light is emitted to the outside, thereby providing a clear and distinct visual boundary for the outputted light function.

The portion of the outer lens 20 from which light is emitted to the outside further comprises an inner surface 24. A part of this inner surface 24 comprises an integrally formed surface texture 26. The surface texture 26 is indicated in the FIGS. 2 (and 7) as individual dots for illustration, which are part of the outer lens 20, i.e. integral with the outer lens 20. The surface texture 26 serves to diffusively transmitted light received from the light source 10. Various preferred embodiments of a surface texture 26 are shown in the context of the FIGS. 3 to 6 as described below. The surface texture 26 may be in other words a surface graining.

The surface texture 26 homogenizes the emitted light coming from the light source 10 as a consequence of diffusive transmission at the microscopic roughness of the processed surface texture 26. Since the processed texture 26 is a direct part, i.e. an integral part, of the outer lens 20 itself, an external vision and optical appearance of the lighting function may be enhanced when viewed from an upper angle, see the present FIG. 2 as example. The light is thus tangible since the outer lens 20 becomes an effective homogeneous light source when viewed from the outside. The integrally formed texture 26 of the outer lens 20 further does not involve an additional layer on the outer lens 20 and thus, the thickness remains low and manufacturing costs can be reduced since no additional layers have to be provided.

The lighting assembly 1 further comprises at least one internal element 50, in this case a bezel member. In other embodiments, the internal element 50 may be a printed circuit board or a support member of the housing member 5, but the invention is not restricted thereto. In this case, the internal element 50 is coupled to the printed circuit board 12.

The internal element 50 and the black mask member 40 are formed to face each other. This requires a positioning or extension of these elements. In particular, the internal element 50 and the black mask member 40 face each other in a manner that a gap 70 is formed between the internal element 50 and the black mask member 40. Further, the internal element 50 and the black mask member 40 are formed such that the gap 70 comprises at least one bent portion 72.

An assembly process would require the step of welding, preferably vibration welding, of the outer lens 20 to the housing member 5, see the welding connections 22 as indicated in the FIGS. 2 to 4. The vibrations, i.e. small oscillatory displacements, require a gap between an internal element 50 and the outer lens 20 in order to prevent destruction or damage during the process of welding. In order to prevent light leakage through the gap, the black mask member 40 is used to generate the required gap 70 in between together with the internal element 50.

Due to the at least one bent portion 72 a light labyrinth is provided.

Thus, light emitted by the light source 10 may for example move in the direction to enter the gap 70 and then may be absorbed due to the bent portion 72 formed between the internal element 50 and the black mask member 40. The absorption is reached due to the bent geometry itself, but also due to the supportive involvement of the black mask member 40 as light-absorbing surface inside the gap 70 for absorbing light that has entered the gap 70. Therefore, the assembly process is improved, since damage is avoided, and also the light leakage is reduced to make a clearer light function.

As can be seen in FIG. 2, the bent portion 72 of the gap 70 may bend more than 90° with respect to the opening direction of the gap 70. In particular, the bending angle may be preferably more than 135°. In this succession, the light leakage may be more reduced, since the amount of absorbed light intensity may be increased by the bending angle, i.e. the light labyrinth may increase light absorbance and decrease light transmittance through the gap 70. The black mask member 40 may include a protruding portion 46. The protruding portion 46 may extend, or protrude, into a channel formed by the internal element 50. Then, the gap 70 is formed between the protruding portion 46 and the internal element 50. In a further embodiment of the present invention, the internal member may comprise the protruding portion and the black mask member 40 the reverse structure.

The channel may comprise side portions 52, 54 opposing each other and a base portion 53 which connects the side portions 52, 54. The side portions 52, 54 may be formed to extend parallel to corresponding surfaces of the protruding portion 46. Thus, a turn of more than 135°, or nearly 180° with respect to the opening direction of the gap 70 may be reached. A width of the gap 70 thus may be constant along the protruding portion 46. The protruding portion 46 may have a cone shape, which narrows towards the base portion 53, which may provide more stability.

The spatial distance between the protruding portion 46 and the base portion 53 and/or spatial distance between the side portions 52, 54 and the protruding portion 46 may be between 2 and 3 mm. When the distance is below 2 mm, vibrations due to welding may damage the internal element 50 at the base portion 53. When the distance D is above 3 mm, light leakage may be too high. Further, a spatial distance D between the side portions 52, 54 and the protruding portion 46 may be between 2 and 3 mm.

The gap 70 may further, as indicated by the upper projecting portion 45 of the black mask member 40 at the upper end of the gap 70, comprise a plurality of bent portions 72, for example with opposite turn directions. Then, light leakage may be even more reduced, since the light absorption of the light labyrinth is enhanced.

The lighting assembly 1 in this preferred embodiment includes a light blocking member 80. The light blocking member 80 may be configured to block light that enters the gap 70. The light blocking element 80 may be positioned inside the gap 70. Due to this positioning, entering light may be absorbed by this element such that light leakage is further reduced.

Preferably, the light blocking element 80 may be of a soft material. Soft material means that the light blocking element 80 may be deformable. It is clear to the person skilled in the art, that the other components, e.g. housing, cover or internal element have stiffness. In particular, the soft material may be capable of absorbing the vibrations arising from a subsequent welding process, i.e. a vibration welding process. Thus, the soft material may be a vibration-absorbing material. In particular, the elasticity of the light blocking element 80 may be higher, i.e. substantially higher, compared to the black mask member 40 and the internal element 50. For example, the light blocking element 80 may be a foam or a glue with such soft material property.

The light blocking element 80 may continuously fill the spatial distance between the protruding portion 46 and the base portion 53. Due to the soft property, the potential contact between the tip of the protruding portion 46 and the base portion 53 may be protected. Further, this may prevent light leakage through the gap 70.

The light blocking member 80 may continuously fill at least the bent portion 72. Then, due to the soft property, also the side portions 52, 54 are protected and the light leakage due to a longer blocking length be increased. The light-blocking element 80 may comprise an opaque material as to prevent light from the light source 10 to pass through the gap 70.

Figure 3A:
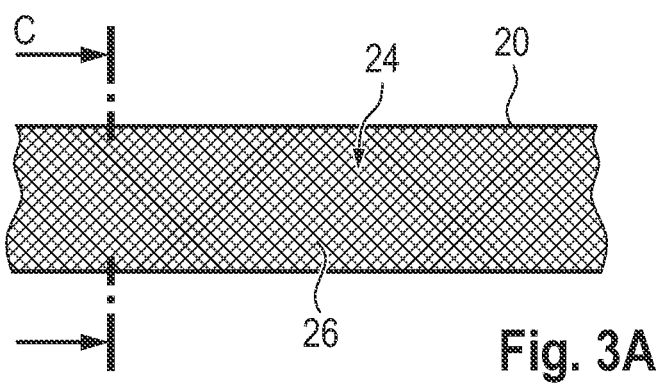
FIG. 3A is an inner surface of the outer lens according to a first embodiment of the invention.

FIG. 3A shows a schematic illustration of an inner surface 24 of the outer lens 20 when viewed in a front view, i.e., when the outer lens 20 is viewed FIG. 3A shows a schematic illustration of an inner surface 24 of the outer lens 20 when viewed in a front view, i.e., when the outer lens 20 is viewed from an inside perspective in FIG. 2. Despite showing a flat projection, the outer lens 20 may have various shapes, i.e. a curved or bent as for example shown in FIG. 2. The outer lens 20 comprises the inner surface 24 (the inner surface 24 of FIG. 2).

The inner surface 24 in this embodiment is formed with a surface texture 26 having a roughness which spans the entire inner surface 24 of the outer lens 20. Then, the entire inner surface 24 serves to homogenize the incident light received from the light source 10.

Figure 3B:
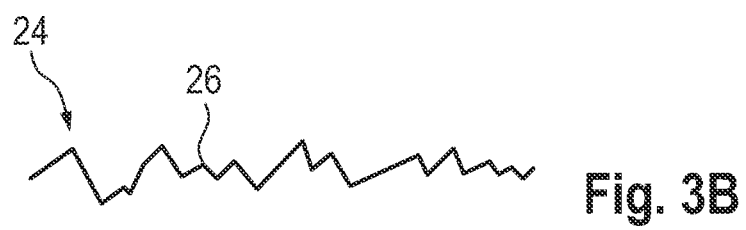
FIG. 3B is a profile of the inner surface of the outer lens according to the first embodiment of the invention.

FIG. 3B shows a schematic embodiment of the inner surface 24 as a cross section view according to section C as indicated in FIG. 3A. The surface texture 26 shows a spatial roughness, in particular a microscopic roughness. The surface roughness can be in a range of an arithmetic mean deviation Ra between 0.4 and 18 µm, preferably between 4 and 18 µm. Incident light is then diffused in transmission at the surface roughness of the inner surface 24 leading to homogenization.

Figure 4A:
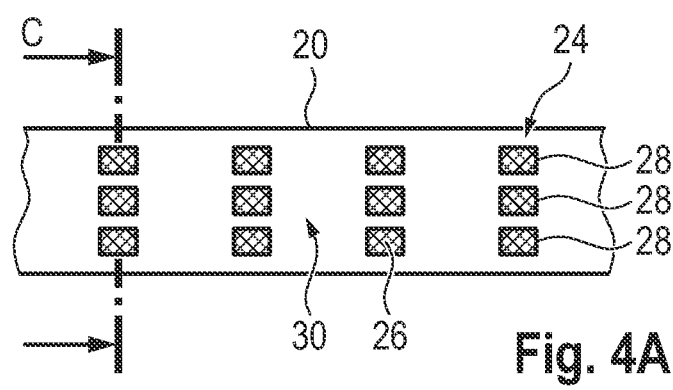
FIG. 4A is a plan view of an inner surface of the outer lens according to a second embodiment of the invention.

FIG. 4A shows a schematic illustration of an inner surface 24 of the outer lens 20 when viewed in a front view, i.e., when the outer lens 20 is viewed from an inside perspective in FIG. 2 according to another embodiment.

The inner surface 24 comprises a plurality of protrusions 28, or raised portions, which are formed in the inner surface 24. Each of the protrusions 28 comprises the surface texture 26. For example, the surface texture 26 may have the same arithmetic mean deviation Ra as disclosed above. Each of the protrusions 28 thus form a local structure at which diffusive transmission occurs in response to when light from the light source 10 is received. Thus, the protrusions 28, i.e., each of the protrusions, form localized diffusive centers which have the effect of homogenizing/diffusing light to render the optical appearance more soft and homogeneous. The number of protrusions 32 and the areal density is merely illustrative, and may be higher than schematically shown in the drawing to increase the effect of homogenization of the outputted light.

The plurality of protrusions 28 in the present case are spatially arranged to form a regular array 32, i.e., a regular grid, of protrusions 28. The protrusions 28 are spaced apart from each other. Such structural patterning, or grid patterning, of the protrusions 28 in the inner surface 24 can be manufactured systematically and in a controlled manner. In particular, constant areal density of protrusions over the inner surface 24 is assured to reach a more homogeneous light output. The intermediate area of the inner surface 24 between the protrusions 28 may be an unprocessed surface 30, which is essentially flat/even between the protrusions 28. At the unprocessed surface 30 light is essentially transmitted without diffusion.

The protrusions 28 formed may have various shapes. Preferably, the shapes comprise one among the group of a square, a rectangular, and/or a circular cross section. In the present case of FIG. 3, the protrusions 28 are rectangular or square-shaped, but the invention is not restricted thereto.

Figure 4B:
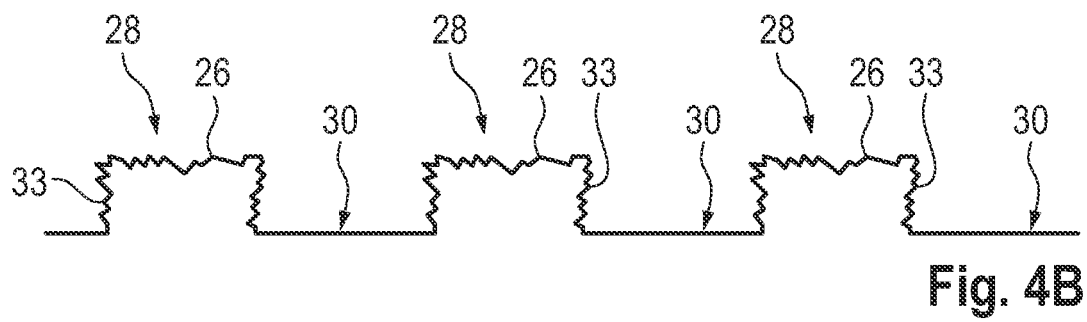
FIG. 4B is a profile of the inner surface of the outer lens according to the second embodiment of the invention.

FIG. 4B shows a schematic view of the protrusions 28 as a cross section taken along the section line C in FIG. 4A. The protrusions 28 comprise in this embodiment side walls. The entire surface, i.e., the side walls 33 and the top surface, of the protrusions 28 may comprise the surface texture 26. The surface texture 26 may have the same dimensions as illustrated in FIG. 3B. Then, the area is increased for homogenization, since also light at the sides walls 33 is diffusively transmitted. The effect can be enhanced by increasing a height of the protrusions 28. Such protrusions 28 can be readily manufactured in an etching process using a mask member. For example, light that is incident diffused at the surface roughness of the localized protrusions 28 and thus leads to a diffusive effect that homogenizes and softens the transmitted light.

Figure 5:
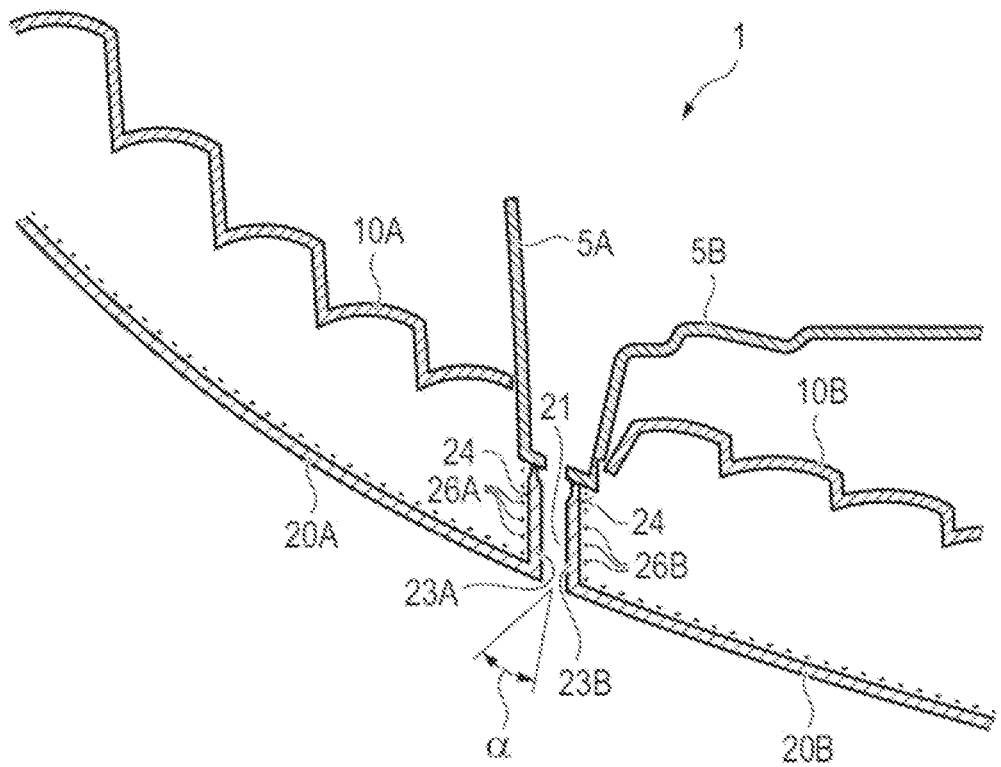
FIG. 5 is a sectional view of a lighting assembly according to an embodiment of the invention.

FIG. 5 discloses yet another embodiment of a lighting assembly 1 according to an aspect of the present invention. The present figure shows a top view perspective according to section B as indicated in FIG. 1.

The lighting assembly 1 comprises a first light source 10A and the second light source 10B which are configured to emit light. The light sources 10A, 10B may be an array of LEDs, a lamp, a light collimator, a light pipe or a light reflector, but the invention is not restricted thereto.

Each of the light sources 10A, 10B is accommodated at least partially in a respective housing 5A, 5B. In this figure, only the relevant parts of the housings members 5A, 5B are shown for the sake of compactness and the skilled person recognizes a continuation of the housings 5A, 5B to form an at least partial enclosure for the light sources 10A, 10B. The housing members 5A, 5B may be made of plastic, but the invention is not restricted thereto. For example, also aluminium may be used or a combination thereof. The light sources 10A, 10B are separately provided from each other. However, the light sources 10A, 10B may be controlled to simultaneously emit light such that a common light signature or common light function may be generated by the two light sources 10A, 10B.

The light assembly 1 may comprise a first outer lens 20A which corresponds to the first light source 10A and a second outer lens 20B which corresponds to the second light source 5B. The outer lenses 20A, 20B may cover the light sources 10A, 10B towards the outside direction. Each of the outer lenses 20A, 20B is at least partially transparent for the emitted light of the respective light sources 10A, 10B. The outer lenses 20A, 20B may be coupled, not shown in this section view, to the respective housing members to form a common enclosure for the light sources 10A, 10B.

The outer lenses 20A, 20B are spatially separated from each other by a separation slit 21. The slit 21 may also be referred to as a spaced distance. The slit 21 may be present due to the presence of a lighted rear lid, front lid or a front grill. Thus, the slit 21 may be required to move or detach different parts separately from each other.

The inner surfaces 24 of the inwardly extending lens portions 23A, 23B comprise the surface texture 26A, 26B. The surface texture 26A, 26B can be configured according to one of the embodiments as disclosed above. The surface texture 26A, 26B homogenizes light which reaches the inwardly extending lens portions 23A, 23B from the respective light sources 10A, 10B. The inner sides of the slit 21 thus emit homogenized light. When an observer views the light signature across the slit 21, homogenized light is emitted from the inwardly extending lens portion 23A, 23B and thus from the outermost edges and inner surfaces along the slit 21 which may reach the eye of the observer or driver.

The surface texture 26A, 26B may lead to a reduction of "light clearance" which is the visual lighting distance over the slit 21. When the surface texture 26A, 26B is applied, this light clearance can be advantageously reduced down to 3 mm which is quasi continuous compared to reference cases of 16 mm. Thus, the lighting signature across the slit 21 is made more continuous through the surface texture 26A, 26B. Further, when an observer or driver views the slit 21 at an angle, e.g., a small angle α, may be already sufficient as it commonly occurs in traffic situations, substantial light from at least one of the inwardly extending lens portion 23A, 23B may reach the eye of the observer. Thus, the homogenized light emitted from the inwardly extending lens portion 23A, 23B visually reduces light clearance. The inwardly extending lens portions 23A, 23B may be coupled to a connection part of the housing member 5A, 5B. The housing 5A, 5B may comprise a plastic material.

Figure 6:
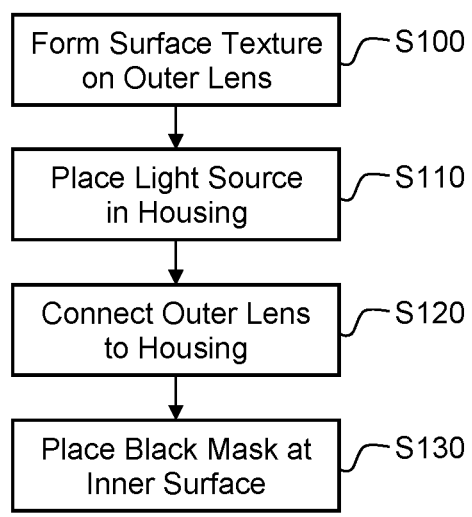
FIG. 6 is a flowchart illustrating a method of manufacturing a lighting assembly according to an embodiment of the invention.

FIG. 6 shows a method of manufacturing a lighting assembly 1 according to one of the previously described embodiments.

The method comprises the step of processing S100 an inner surface 24 of at least a portion of an outer lens 20 to obtain an integrally formed surface texture 26 to diffusively transmit received light.

The method further comprises the step of accommodating S110 a light source 10 in a housing 5 configured to emit light. The method further comprises the step of coupling S120 the outer lens 20 to the housing 5 such that the portion of the outer lens 20 is positioned to receive light emitted from the light source 10 and to transmit the received light to the outside. A further step comprises to at least partially surround S130 a black mask member 40 around the portion of the inner surface 24. The processing can in particular comprise injection molding in which an etched tool is used to generate the surface texture 26. In particular, the etching comprises laser etching or chemical etching. With these methods local roughness can be generated to obtain the effect diffusive transmittance.

The lighting assembly 1 as disclosed in various embodiments according to the present invention provides a contrast-clear light signature that have light homogenization effect is realised without additional layers, with reduced material and manufacturing costs. Additionally, such a solution does not involve an additional member, i.e. a diffusor or an additional coating layer, such that thickness remains low and no additional material is required.

The following is a summary list of reference numerals and the corresponding structure used in the above description of the invention:
- 1 lighting assembly
- 2A first lighting array
- 2B second lighting array
- 5 housing member, housing
- 10, 10A, 10B light source
- 11 LED
- 12 printed circuit board
- 13 light reflector
- 20, 20A, 20B outer lens
- 21 gap (separation)
- 22 welding connection
- 23A, 23B inwardly extending lens portion
- 24 inner surface
- 26 surface texture
- 28 protrusion
- 30 unprocessed inner surface
- 32 protrusion array
- 33 side wall
- 40 black mask member
- 46 protruding portion
- 50 bezel member/internal element
- 52 first side portion
- 53 base portion
- 54 second side portion
- 70 gap
- 72 bent portion
- 80 light blocking element
- 100 vehicle
- S100 processing an inner surface to form surface texture
- S110 accommodate a light source
- S120 couple the outer lens
- S130 surround black mask

The invention claimed is:

1. A lighting assembly for a vehicle, the lighting assembly comprising:
 a housing;
 a light source disposed in said housing and configured to emit light, said light source including a first light source and a second light source;
 an outer lens coupled to said housing, said outer lens having a transmission portion thereof positioned to receive light emitted from said light source and to transmit the light to an outside of said housing;
 a black mask member disposed between said light source and a portion of said outer lens, said black mask member at least partially surrounding said transmission portion of said outer lens thereby defining a sharp and clear boundary between a light-emitting portion of the lighting assembly and an opaque and non-light-emitting, masked peripheral portion of the lighting assembly, wherein:
 said transmission portion of said outer lens has an inner surface formed, at least in a part of said inner surface, with an integrally formed surface texture configured to diffusively transmit the light received from said light source;
 said outer lens includes a first outer lens corresponding to said first light source and a second outer lens corresponding to said second light source;
 each of said first outer lens and said second outer lens being transparent for light emitted from said respective first light source and said second light source in an outward direction;
 said first outer lens and said second outer lens being spaced apart from one another by a separation gap;
 each said first outer lens and said second outer lens having an inwardly extending lens portion that extends in an inward direction on a respective side of said separation gap; and
 said inwardly extending lens portions having inner surfaces formed with said surface texture.

2. The lighting assembly according to claim 1, wherein said surface texture has a surface roughness with an arithmetic mean deviation Ra between 0.4 µm and 18 µm.

3. The lighting assembly according to claim 1, wherein the surface roughness has an arithmetic mean deviation Ra between 4 µm and 18 µm.

4. The lighting assembly according to claim 1, wherein said surface texture is formed on an entire said inner surface.

5. The lighting assembly according to claim 1, wherein said inner surface is formed with a plurality of protrusions formed in said inner surface, with each of said protrusions being formed with said surface texture.

6. The lighting assembly according to claim 5, wherein said protrusions have a cross-sectional shape selected from the group consisting of a square shape, a rectangular shape, and a circular shape.

7. The lighting assembly according to claim 5, wherein said plurality of protrusions are arranged to form a regular array of spaced-apart protrusions.

8. The lighting assembly according to claim 5, wherein regions between said protrusions are not-formed as a plain surface.

9. A method of manufacturing a lighting assembly, the method comprising the steps of:
 providing a light source configured to emit light, a housing, and an outer lens;
 processing at least a part of an inner surface of at least a transmission portion of the outer lens to obtain an integrally formed surface texture to diffusively transmit received light;
 accommodating the light source in the housing;
 coupling the outer lens to the housing such that the at least one transmission portion of the outer lens is positioned to receive light emitted from the light source and to transmit the received light to the outside; and
 placing a black mask member between the light source and a portion of the outer lens to at least partially surround the at least one transmission portion of the outer lens thereby defining a sharp and clear boundary between a light-emitting portion of the lighting assembly and an opaque and non-light-emitting, masked peripheral portion of the lighting assembly, wherein:

said outer lens includes a first outer lens corresponding to a first light source and a second outer lens corresponding to a second light source;

each of the first outer lens and the second outer lens being transparent for light emitted from the respective first light source and second light source in an outward direction;

the first outer lens and the second outer lens being spaced apart from one another by a separation gap;

each of the first outer lens and the second outer lens having an inwardly extending lens portion that extends in an inward direction on a respective side of the separation gap; and the inwardly extending lens portions having inner surfaces formed with the surface texture.

10. The method according to claim 9, wherein the step of processing the inner surface of the outer lens comprises injection molding the outer lens in a mold having an etched surface to generate the surface texture.

11. The method according to claim 10, which comprises forming the etched surface of the mold by etching with laser etching or chemical etching.

12. A vehicle, comprising a lighting assembly according to claim 1.

* * * * *